US009262943B2

(12) United States Patent
Clash

(10) Patent No.: US 9,262,943 B2
(45) Date of Patent: Feb. 16, 2016

(54) CPR MANNEQUIN

(76) Inventor: Oneal Clash, Naperville, IL (US)

( * ) Notice: Subject to any disclaimer, the term of this patent is extended or adjusted under 35 U.S.C. 154(b) by 726 days.

(21) Appl. No.: 12/411,223

(22) Filed: Mar. 25, 2009

(65) Prior Publication Data

US 2010/0021876 A1  Jan. 28, 2010

Related U.S. Application Data

(60) Provisional application No. 61/070,867, filed on Mar. 26, 2008.

(51) Int. Cl.
G09B 23/28 (2006.01)

(52) U.S. Cl.
CPC .............. G09B 23/288 (2013.01); G09B 23/28 (2013.01)

(58) Field of Classification Search
CPC ...... G09B 23/00; G09B 23/28; G09B 23/288; G09B 23/30
USPC .......................... 434/262, 265, 267, 272, 275
See application file for complete search history.

(56) References Cited

U.S. PATENT DOCUMENTS

| | | | | |
|---|---|---|---|---|
| 3,872,609 A * | 3/1975 | Smrcka | ................ | G09B 23/288 264/DIG. 14 |
| 4,087,933 A * | 5/1978 | Strongin | ................ | A63H 3/001 434/268 |
| 4,850,876 A * | 7/1989 | Lutaenko | ............. | G09B 23/288 434/265 |
| 4,932,879 A * | 6/1990 | Ingenito | ............... | G09B 23/288 273/454 |
| 5,580,255 A * | 12/1996 | Flynn | ................... | G09B 23/288 434/265 |
| 6,575,757 B1 * | 6/2003 | Leight | ................... | G09B 23/30 434/273 |
| 2003/0044758 A1 * | 3/2003 | Ray | ....................... | G09B 23/28 434/267 |
| 2004/0058305 A1 * | 3/2004 | Lurie et al. | ..................... | 434/265 |
| 2007/0054254 A1 * | 3/2007 | Cook | ..................... | G09B 23/30 434/262 |
| 2009/0035740 A1 * | 2/2009 | Reed | .................... | G09B 23/288 434/265 |

* cited by examiner

Primary Examiner — Gene Kim
Assistant Examiner — Alyssa Hylinski
(74) Attorney, Agent, or Firm — Scherrer Patent & Trademark Law, P.C.; Stephen T. Scherrer; Monique A. Morneault

(57) ABSTRACT

A CPR training mannequin includes a humanoid torso, the torso composed of a material having a degree of transparency. A humanoid head is connected to the torso and has a mouth opening connected to a ventilation tube within the head. The torso is supported by resilient elements from the base to simulate resistance to chest compressions. A simulated heart and simulated lungs are arranged within the torso and are visible through the front surface of the torso. Sensors measure the air flow during CPR ventilation and depth of CPR chest compressions. Lights within the heart, brain and lungs indicate the chest compressions and ventilation are adequate to resuscitate the simulated victim.

16 Claims, 7 Drawing Sheets

CPR MANNEQUIN

This application claims the benefit of U.S. Provisional Application No. 61/070,867, filed Mar. 26, 2008.

BACKGROUND OF THE INVENTION

Mannequins are used as aids in teaching cardiopulmonary resuscitation (CPR). Students can practice and learn the proper techniques of chest compression and mouth-to-mouth resuscitation (MMR) without acting on an actual patient. CPR mannequins have been known that simulate human appearance closely so that the students will be accustomed to the look and feel of performing CPR in a real life situation.

The present inventor has recognized that it would be desirable if a CPR mannequin simulated the look and feel of a human while also being substantially race neutral. The present inventor has recognized that it would be desirable to provide a CPR mannequin that provided immediate feedback to the CPR trainee that the CPR procedure being performed by the trainee was accomplishing the required degree of ventilation and chest compressions to revive the simulated patient. The present inventor has recognized that it would be desirable if a CPR mannequin provided immediate feedback that was observable easily by a CPR instructor in front of a class of trainees each of which is performing on a different mannequin. The present inventor has also recognized that it would be desirable if a CPR mannequin provided active feedback or interaction with the trainee that would be interesting and entertaining such as to stimulate the trainee to perform and learn to a greater degree.

SUMMARY OF THE INVENTION

The invention provides an improved CPR training mannequin. The CPR training mannequin includes a humanoid torso, the torso composed of a material having a degree of transparency. A humanoid head is connected to the torso and has a mouth opening connected to a ventilation tube within the head. The torso is supported from a base. At least one resilient element and preferably two or more, are provided to simulate chest compressions. The resilient elements are located between a front surface of the torso and the base. The resilient element or elements resist downward displacement of the front surface of the torso during simulated chest compressions. A simulated heart and simulated lungs are arranged within the torso and are visible through the front surface of the torso. The simulated heart includes heart lights and the lungs include lung lights. A control can be located preferably in, or on, or external to the mannequin. A ventilation sensor and a displacement sensor are signal-connected to the control, the ventilation sensor being located in the ventilation tube and the displacement sensor being arranged to measure movement of the front surface of the torso with respect to the base. The ventilation sensor preferably measures flow rate of air. The control compares ventilation from the ventilation sensor with acceptable CPR ventilation values and compares displacement from the displacement sensor with acceptable CPR chest displacement values, and issues an illumination command to the heart lights only if the displacement is satisfactory and to the lung lights only if the ventilation is satisfactory.

The head can also be composed of a material having a degree of transparency. The head can include a simulated brain visible through the head, the brain having brain lights. The brain lights receive a command to illuminate from the control only if the displacement is acceptable. The head can be pivotally connected to the torso, and a sensor can be provided that is triggered when the head is correctly tilted to open a simulated airway for ventilation.

According to the preferred embodiment, the resilient element is arranged between a back side of the torso and the base, wherein during simulated chest compressions the entire torso is displaced toward the base.

The control can include a timing counter wherein the control compares the rate of simulated chest compressions and acceptable CPR compression rate values and only if the rate and displacement are acceptable will the heart lights be illuminated.

The control can include a timing counter wherein the control compares the rate of ventilation and acceptable CPR ventilation rates and only if the rate and flow rate of ventilation are acceptable will the lung lights be illuminated.

Numerous other advantages and features of the present invention will be become readily apparent from the following detailed description of the invention and the embodiments thereof, from the claims and from the accompanying drawings.

DETAILED DESCRIPTION

Figure 1:
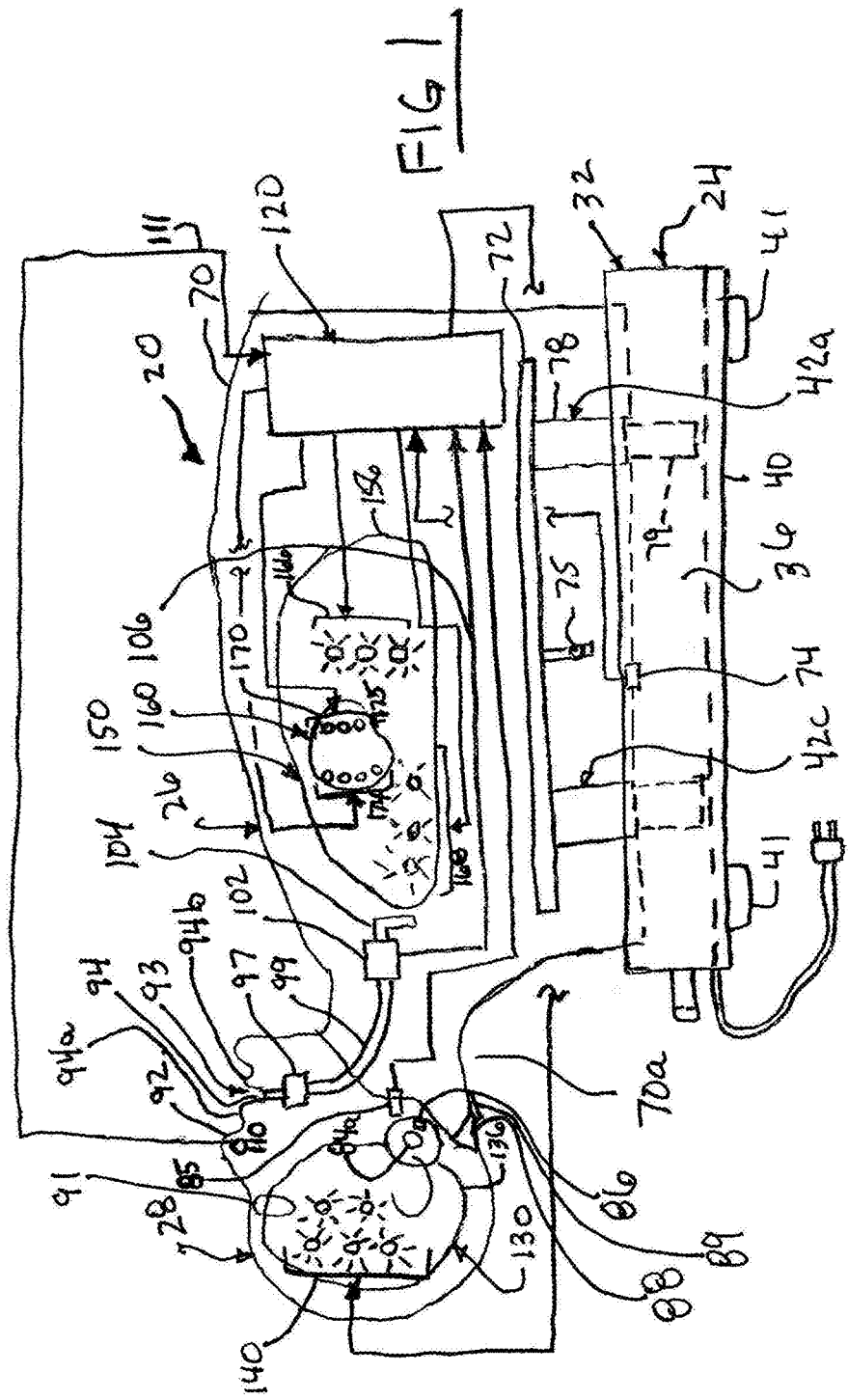
FIG. 1 is a schematic side elevation view of a CPR mannequin according to the present invention, shown in an initial state.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Exemplary Embodiment

FIGS. 1-7 illustrate a CPR mannequin 20 according to an exemplary embodiment of the present invention. The CPR mannequin 20 is oriented to lie horizontally to simulate a person in position for CPR treatment. The mannequin comprises a base 24 and a humanoid torso 26 and head 28 supported on the base 24.

The base 24 includes a lightweight frame 32 such as one made of steel or aluminum. The frame 32 includes a surrounding side wall 36 closed on a bottom face by a bottom wall 40. Rubber feet 41 are attached to an outside of the wall 40. At least one resilient element, such as four resilient assemblies 42a, 42b, 42c, 42d, arranged in a rectangular grid pattern, extend upward from the bottom wall 40. The frame also mounts a carrying handle 50 and electric power cord 52.

The torso 26 includes a plastic shell 70 that is shaped on its upper and side surfaces to simulate a human torso, and a support plate 72 within a volume bounded by the shell and attached to the shell 70, by bonding, fasteners or other method. A lower area of the shell has a more box-like contour to hold functional components. The four resilient assemblies 42a, 42b, 42c and 42d support the support plate 72 from the bottom wall 40 of the base 24.

Figure 4:
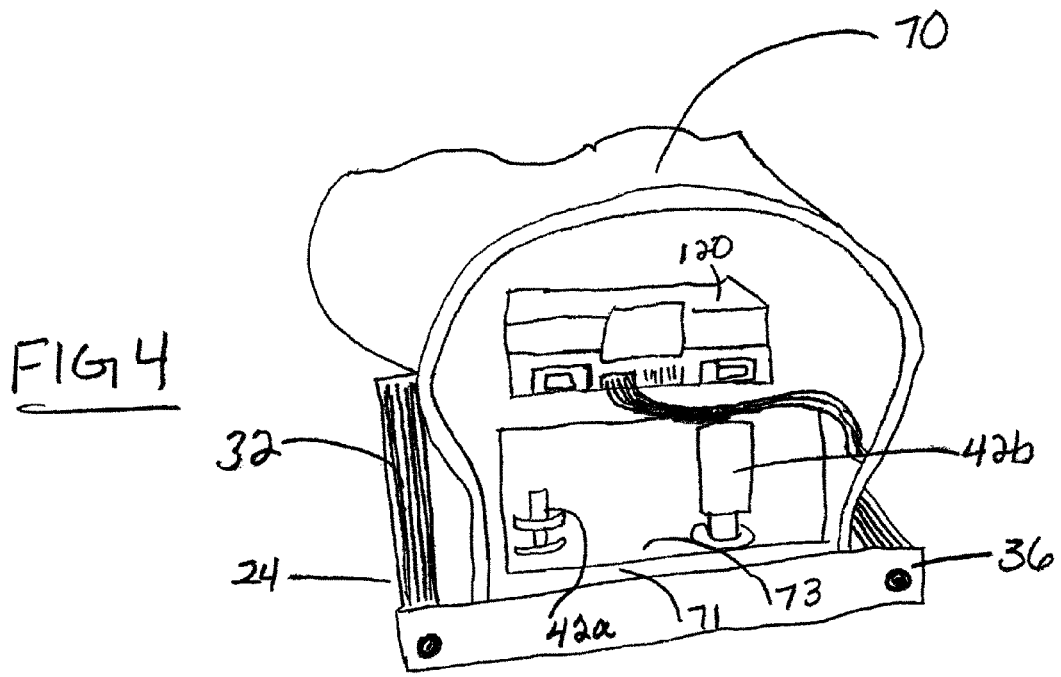
FIG. 4 is an end view of the mannequin according to the invention.
Figure 5:
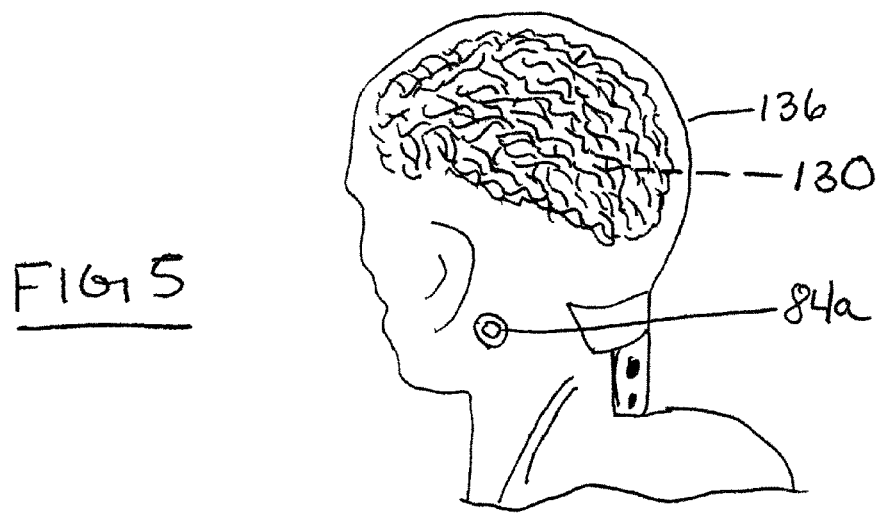
FIG. 5 is an enlarged fragmentary rear perspective view of a head portion of the mannequin.
Figure 6:
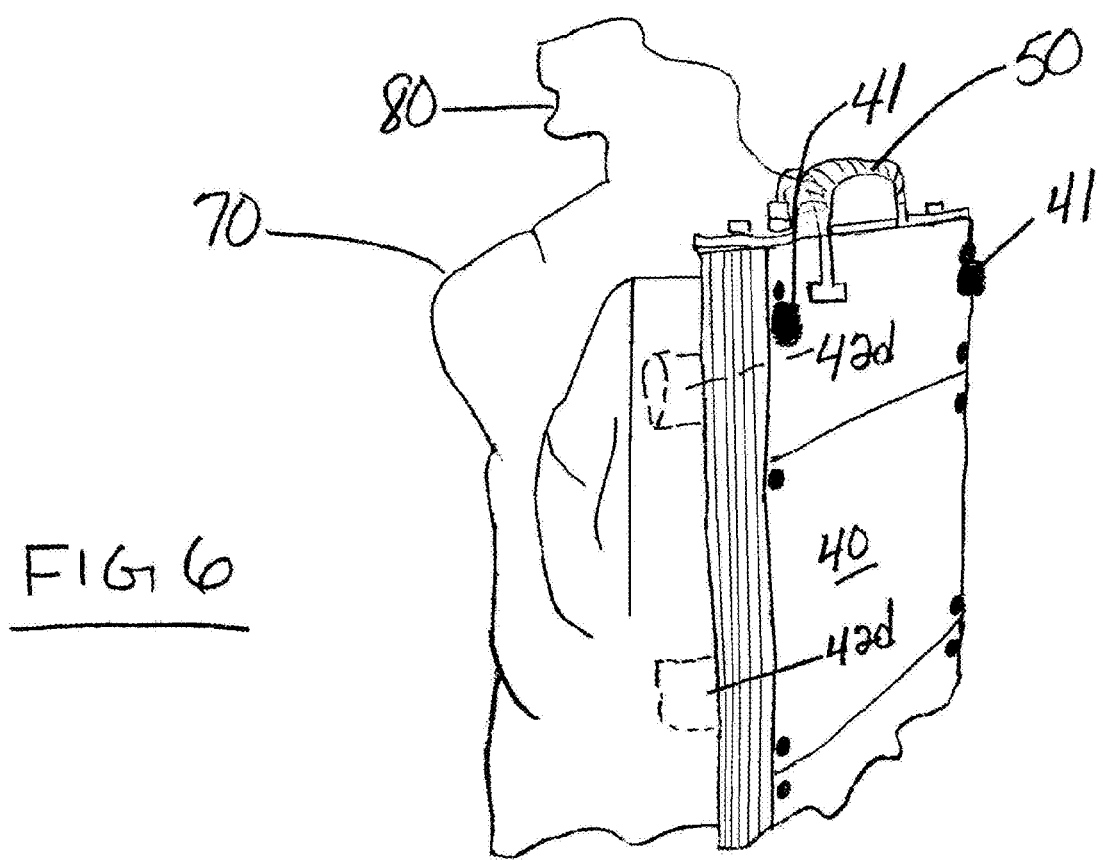
FIG. 6 is a fragmentary rear perspective view of the torso region of the mannequin.

As shown in FIG. 4, the support plate 72 can be the top wall of a large, metal rectangular tube. A bottom wall 73 of the tube can be fixed to a bottom wall 71 of the shell 70, to fix the support plate 72 to the shell 70. Holes are arranged through the bottom walls 71, 73 to accommodate pass-through of the resilient assemblies 42a, 42b, 42c, 42d through the walls 71, 73 in order for the resilient assemblies 42a, 42b, 42c, 42d to be supported on the bottom wall 40 of the base 24.

Returning to FIG. 1 a chest compression proximity switch 74 is mounted to the frame 32 and a proximity target 75 is mounted to the support plate 72. The proximity switch 74 issues an electronic signal 76 when the target 75 moves into the sensing range of the proximity switch 74 by the support plate 72 being forcibly lowered toward the frame bottom wall 40, against the resilient force of the springs 42a, 42b, 42c, 42d, during a simulated chest compression, as shown in FIG. 2. Alternately, the proximity switch 74 and target 75 can be fixed respectively to any two positions between the shell 70 and the base 24 to sense the required relative displacement therebetween to ensure adequate simulated chest compression.

Each resilient assembly can include a first cylinder 78 and a second cylinder 79 telescopically fit within the first cylinder 78. Within the two cylinders can be arranged a coil spring, and/or a resilient, compressible material, and/or a pneumatic or hydraulic fluid material and associated fluid channels, and/or an electromechanical device or any known method of providing a resistance to the pressing down of the shell 70 toward the frame 24, with a restoring force to lift the shell 70 back away from the frame, after a simulated compression stroke. The resilient assemblies allow simulated chest compressions of 1½ to 2 inches, corresponding to vertical downward movement of the shell 70 with respect to the base 24. When performing chest compressions, the resilient assemblies must absorb 80-120 pounds of pressure to position the target 75 and proximity switch 74 in signal-inducing alignment.

Figure 2:
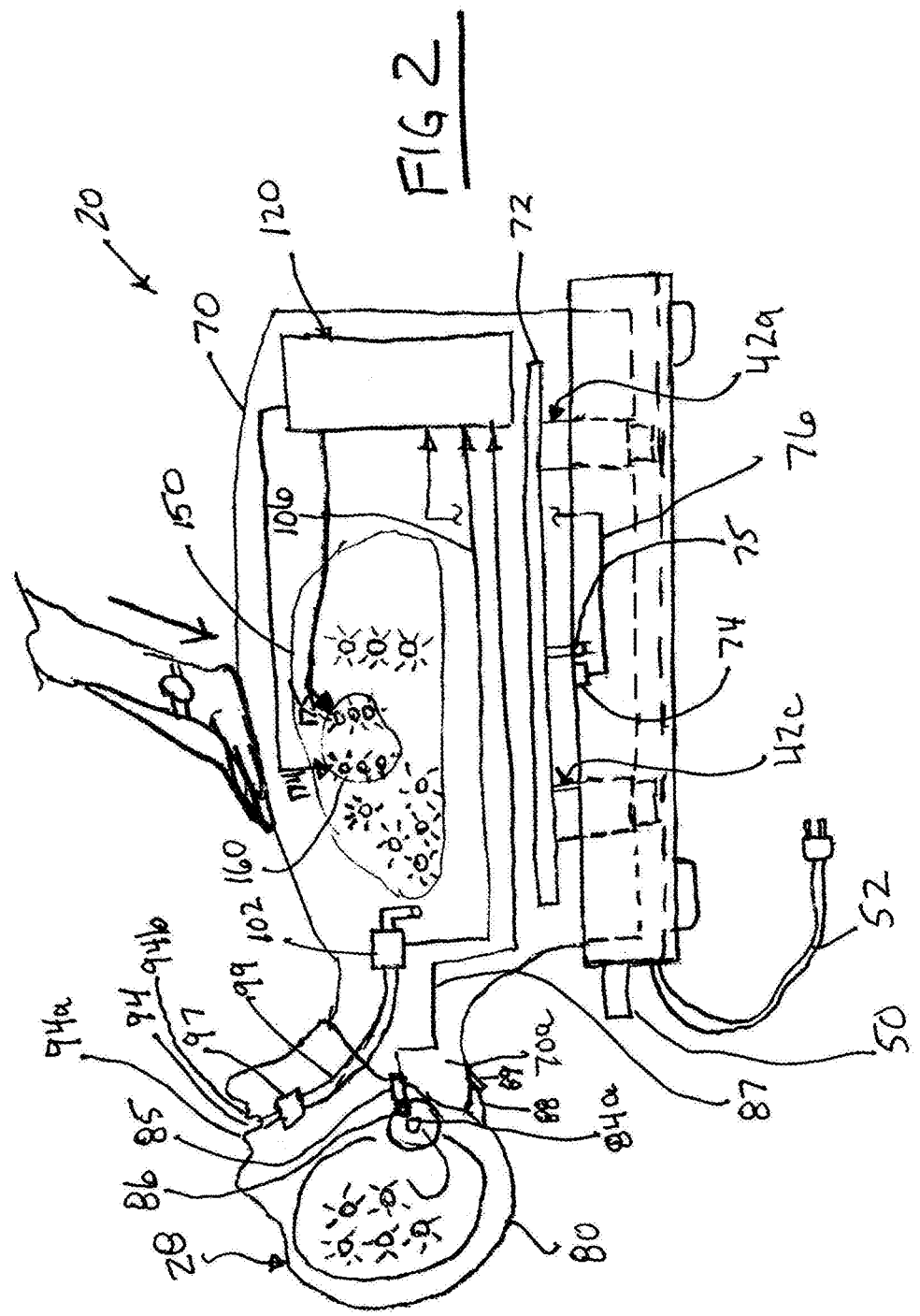
FIG. 2 is a schematic side elevation view of the mannequin of FIG. 1, shown in simulated chest compressed state.
Figure 3:
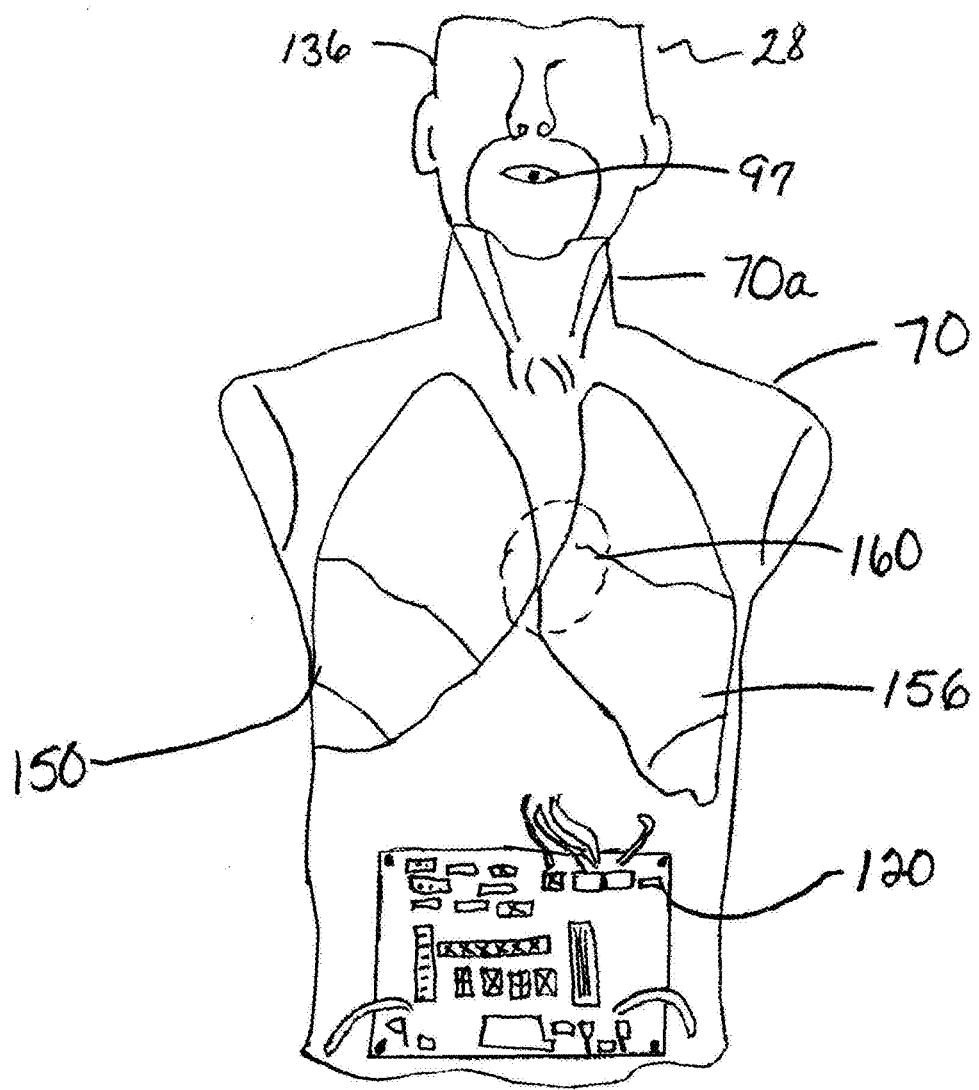
FIG. 3 is an elevation view of the mannequin according to the invention.

The vertical downward movement of the shell 70 with respect to the base 24 is demonstrated by FIG. 1 which illustrates the shell at a top of its travel, and FIG. 2 which demonstrates the shell 70 at a bottom of travel, one compression stroke.

Although four resilient assemblies are shown in the figures, any number of one resilient element or assembly or greater is encompassed by the invention.

Although resilient assemblies with two cylinders 78, 79 are shown, other types of resilient devices, not incorporating cylinders, are encompassed by the invention, such as exposed coil springs.

The head 28 includes an outer plastic shell 80 that is shaped to simulate a human head. The shell 80 is pivotally connected to the shell 70 by a through bolt or pin 84a that passes through the head shell 80 and a neck portion 70a of the torso shell 70. A head tilt proximity switch 85 is arranged at a fixed position in the torso shell 70 and senses position of a proximity target 86 that is fixed to the head shell 80 and orbits around the pin 84a as the head is pivoted. As the head is tilted back, the proximity target 86 moves closer to the proximity switch 85. When the proximity target 86 is within sensing range of the proximity switch 85, the proximity switch 85 issues an electronic signal 87.

The pivoting of the shell 80 with respect to the torso shell 70 is demonstrated by FIG. 1 which illustrates the shell 80 at a relatively level position, and FIG. 2 which demonstrates the shell 80 tilted back a pre-selected, required amount.

A resilient foam block 88 is arranged between the shell 80 and the shell 70 and retained by a bracket 89 fixed to the shell 70. This block 88 is compressed when the shell 80 pivots back, such as pivoting from the position shown in FIG. 1 to the position shown in FIG. 2. This block provides simulates some resistance is pivoting the simulated head back to a ventilation position.

The head includes areas which simulate eyes 91, a nose 92 and a mouth 93. The mouth 93 is open, having an aperture 94 surrounded by simulated lips 95a, 95b. Behind the aperture 96 is an adapter or mate 97 that can be used for installation of a shield. The shield is one way device that prevents cross-contamination of saliva between operator and mannequin. The adapter 98 is fluidly connected to a breathing tube 99. The breathing tube 99 is fluidly connected an air flow sensor 102. The air flow sensor 102 is fluidly connected to an outlet tube 104 that is open to atmosphere. The air flow sensor 102 measures air volumetric flow rate through the sensor and outputs an electronic signal 106 that corresponds to the magnitude of the air volumetric flow rate measured.

According to a further enhancement, a pressure sensitive switch 110, such as a spring loaded momentary switch, can be provided within a soft compliant nose. When the nose is pinched with sufficient force by the trainee during CPR, the switch 110 sends a signal 111.

According to the exemplary embodiment, the torso shell 70 and the head shell 80 are composed of a relatively hard, transparent plastic. The invention also encompasses translucent plastics as well.

A control 120 is located within the torso shell 70 at a position furthest from the head. The control 120 can be a microprocessor or other electronic computing device, circuitry or other device that can process signals from sensors, timers or other devices and issue commands to annunciators, such as light emitting or sound emitting devices, or other devices. The control can have a processor, memory, a timer or counter and can have an input to receive signals from an external device such as a keyboard, and an output to send signals to an external device, such as a printer or monitor or other device. According to the exemplary embodiment, the control comprises electronic elements mounted on one or more circuit boards. The control 120 conditions domestic power from the power cord 52 and selectively supplies power to the LED lights within the mannequin.

The chest compression proximity switch 74 sends the electronic signal 76 to the control 120. The electronic signal 106 from the air flow sensor 102 is also sent to the control 120. The switch 110 sends the electronic signal 111 to the control 120 as well.

Within the head shell 80 there is a simulated brain 130. The simulated brain 130 includes a brain shell 136 that is preferably composed of plastic and is translucent or transparent. Preferably, the brain shell 136 has an outer surface that mimics the undulating surface of a brain. The brain shell is substantially hollow.

Figure 7:
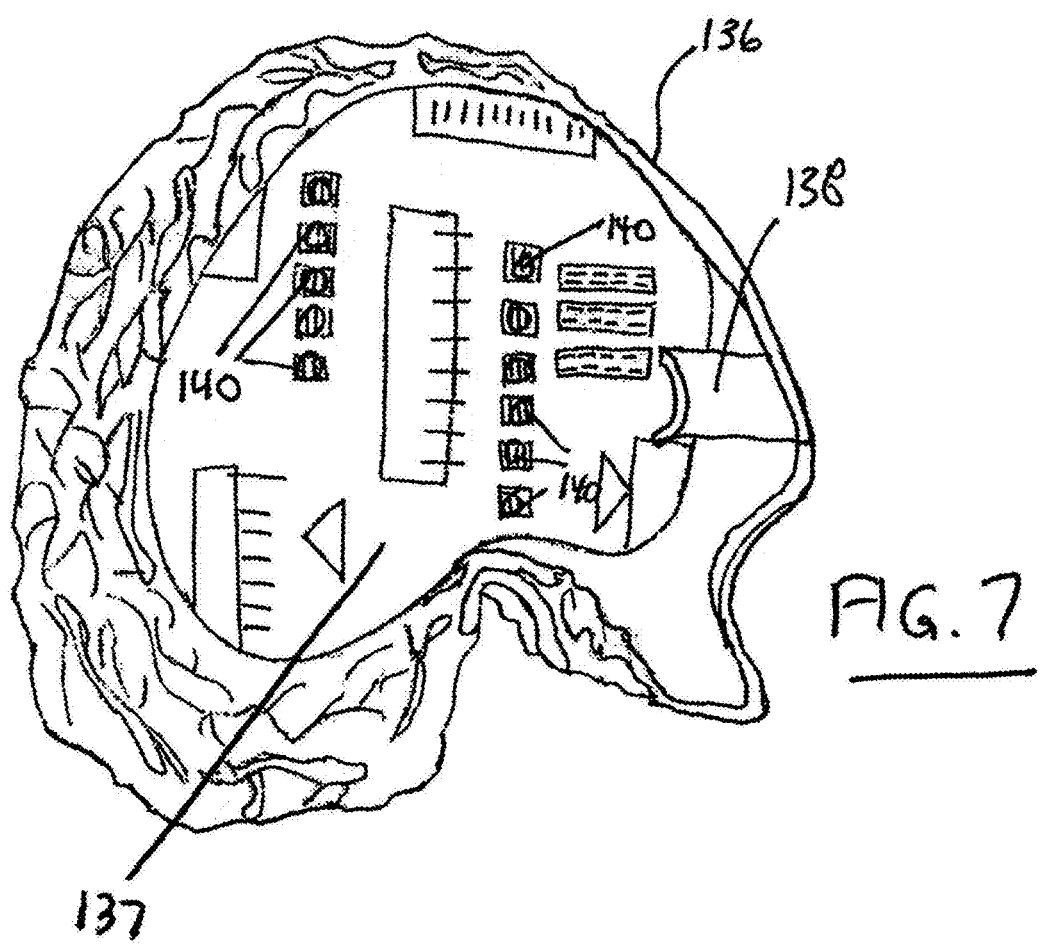
FIG. 7 is a sectional view taken generally through the simulated brain generally along line 7-7 in FIG. 5.

As shown in FIG. 7, within the brain shell is arranged a circuit board 137 retained by one or more clips 138 formed as part of the brain shell 136 upon which are arranged a plurality of lights, such as brain LED lights 140. The brain LED lights 140 are signal-connected to the control 120, to illuminate upon command by the control 120. Other electronic elements can be mounted on the circuit board such as electronic elements used for advanced features discussed hereinafter.

Within the torso shell 70 are located left and right simulated lungs 150, 152 and a simulated heart 160 beneath the simulated lungs 150, 152. Each simulated lung 150, 152 includes a hollow shell 156 composed of plastic that is translucent or transparent. The surface of the shell 156 is preferably molded to simulate the surface contours of actual human lungs. Within each hollow shell 156, a first plurality of LED lights 166 are arranged on a first circuit board (not shown) in an area of the shell that is farthest from the simulated head, and a second plurality of LED lights 168 that are located closer to the head on a second circuit board (not shown). The first and second pluralities 166, 168 are signal-connected separately to the control 120 to illuminate independently upon command by the control 120.

The first and second circuit boards within the shell 156 of each lung 150, 152 can be mounted in a similar fashion as the circuit board 137 is mounted inside the shell 136 shown in FIG. 7.

The simulated heart 160 includes a shell 170 composed of plastic that is translucent or transparent. The surface of the shell 170 is preferably molded to simulate the surface contours of an actual human heart. A first plurality of LED lights 174 and a second plurality of LED lights 175 are arranged on a circuit board within the shell 170. The first plurality of LED lights 174 corresponds to the upper chamber of the heart and the second plurality of lights 175 corresponds to the lower chamber of the heart. The pluralities of LED lights 174, 175 are signal-connected to the control 120 to illuminate upon command by the control 120.

The circuit board within the shell 170 of the heart 160 can be mounted in a similar fashion as the circuit board 137 is mounted inside the shell 136 shown in FIG. 7.

According to the preferred embodiment, the shells 70, 80, 136, 156, 160 are all sized and shaped as realistic simulations of the corresponding human body part. The mannequin measures from end of head to end of torso approximately 31 inches long. From end of head to beginning of shoulders is approximately 21 inches. The span from shoulder to shoulder is approximately 16 inches. The abdomen is approximately 10-12 inches across. The lungs measure approximately 10 to 12 inches long. The base measures 19.5 inches long and 2 inches high.

Although the system of the invention mentions pluralities of LED lights, other lights, such as individual lights and non-LED lights are also encompassed by the invention.

The proximity switches referred to herein are well known in the art such as disclosed in U.S. Pat. No. 5,877,664, herein incorporated by reference. Air flow sensors are also well known in the art such as described in U.S. Pat. No. 5,925,831, herein incorporated by reference.

Operation

Upon first turning on the mannequin for a training session, the heart lights illuminate red according to a heart beat rhythm with the first plurality of lights 174 illuminated first and the second plurality of lights 175 illuminated second to simulate the beating of a heart in a rhythm the upper chamber then the lower chamber. The brain illuminates red indicating adequate blood profusion. The brain lights and heart lights illuminate for approximately 5-8 seconds and then shut off automatically simulating a cardiac arrest. The shut off indicates absence of profusion of blood and oxygen to the brain, heart and lungs as well as absence of a heartbeat. It is up to the trainee performing CPR to get the mannequin functioning again, that is, having the heart lights, brain lights and lung lights illuminate red again. This is achieved with proper cardiopulmonary resuscitation.

In order to provide proper CPR ventilation, the head of the mannequin must be properly tilted back about the pin 84a. When the head is tilted a required amount, to simulate proper opening of a patient's airway during CPR, the first plurality of lung lights are commanded to illuminate by the control 120 which receives a position signal 87 from the proximity switch 85. The operator must tilt a patient's head so that the patient's chin is elevated about 2 inches to activate the first plurality of lung lights in the lungs. To simulate the resistance of a tilting head of an actual patient, there is a 2 inch foam piece that connects from the base of the back of the head to the neck.

The trainee pinches the nose to simulate the pinch-closing of the nostrils of an actual patient during CPR. The switch 110 sends the signal 111 to the control that the nose is pinched closed.

Next, the trainee must perform simulated bag mask ventilation, mouth to mouth ventilation, or mouth to shield ventilation into the open mouth 94. The trainee must produce approximately 500 ml volume of air per breath in order for the control 120 to activate the first and second pluralities of lung lights to illuminate. However, this will only be operable if the head has been tilted back enough to cause the control to illuminate the first plurality of lung lights and the nose is pinched to actuate the switch 110.

Next, the trainee must perform chest compressions on the shell 70 to simulated chest compressions of 1½ to 2 inches, corresponding to vertical downward movement of the shell 70 with respect to the base 24. When performing chest compressions, the resilient assemblies must absorb 80-120 pounds of pressure to position the target 75 and the proximity switch 74 to send the signal 76 to the control 120.

According to a basic version of the exemplary embodiments, the signals 106 and 76 are evaluated by the control 120 for magnitude only, that is, the air flow must be of a pre-selected magnitude and the chest compressions must be of a pre-selected depth. However, according to a more advanced version of the exemplary embodiment, the control 120 can also count and time both the ventilations and chest compressions to ensure that the CPR is proceeding at a pre-selected rate to revive the simulated patient.

Once the heart lights and brain lights have been successfully illuminated and the lung lights have been successfully illuminated, both for a predetermined time period, the control will command all the lights to flash to indicate the successful revival of the patient.

The pre-selected magnitudes and rates of ventilations and chest compressions are typically established by medical authorities such as the AMERICAN HEART ASSOCIATION or the RED CROSS.

According to enhanced features of the invention, the control 120 can be connected to sound producing circuitry and a speaker that produces audible step-by-step voice prompting, instructing trainee on CPR in selectable languages. Additionally, liquid filled vessels and tubes containing a colored fluid can demonstrate blood flow through the mannequin, particularly between the heart and the brain during chest compressions. The liquid can be moved manually by pumping under the force of the compressions or can be automatically circulated by a pump and signal from the control corresponding to the depth of the chest compressions on the simulated torso. Also, the areas of the head for the eyes can have simulated eye ball and lids which cause the eyes to roll and the eyelids to move to simulate actions during an actual cardiac arrest and recovery through CPR. As a further enhancement the shells can be transparent but also can have a tint of selectable colors. The colors can correspond to a simulated race of a patient. The power source for the CPR mannequin can be domestic electric power through a power plug and cord or can be via a battery pack, preferably a rechargeable battery pack. The batteries can be lithium batteries and the batteries could be recharged by solar cells arranged on a cover or the base of the mannequin. Further, the head of the mannequin can be made more lifelike by having in the airway: teeth, a tongue, an esophagus, an epiglottis, etc. These elements would be made visible through the transparent shells 70, 80 of the torso and head of the mannequin. The torso could be made more realistic by displaying simulated breasts, nipples externally and muscles, other internal organs and skeleton bones internally, through the shell 70. Alternately, rather than just the head and torso, a full human body can be simulated to make even more realistic the CPR experience for the trainee. For ventilating the simulated patient, an expandable rubber or plastic bladder can be used instead of, or in addition to, the air flow sensor to provide a pressure resistance to the ventilation of the simulated patient. For further realism, pliable simulated ribs can be located within the torso and sounds and feel of simulated ribs breaking can be created by the control via a sound source and an actuator acting against the support plate. Still further, a bladder can be provided for carotid pulse check.

As further enhancements, a head to torso connection can be provided that allows the head to pivot about two axes, front to back and left to right to more realistically simulate head movement for the CPR trainee. Although the preferred embodiment includes a transparent head and a transparent torso, it is within the scope of the invention that one of these two components is not transparent. Also, although according to the preferred embodiment the shells 70, 80 are transparent, it is within the scope of the invention that these components are translucent rather than transparent, or these components have a transparence that is less than 100 percent. It is within the scope of the invention that the torso has simulated arms, transparent, translucent or opaque.

Although in the exemplary embodiment the entire shell 70 moves up and down to simulate chest compressions, it is also encompassed by the invention that the shell be made flexible and that only the top surface of the shell moves down, i.e., the shell compresses rather than translates. According to this variation the resilient assemblies or elements would exert an upward force on the top wall of the torso shell 70 and the bottom wall would remain stationary with respect to the base 24.

Figure 8:
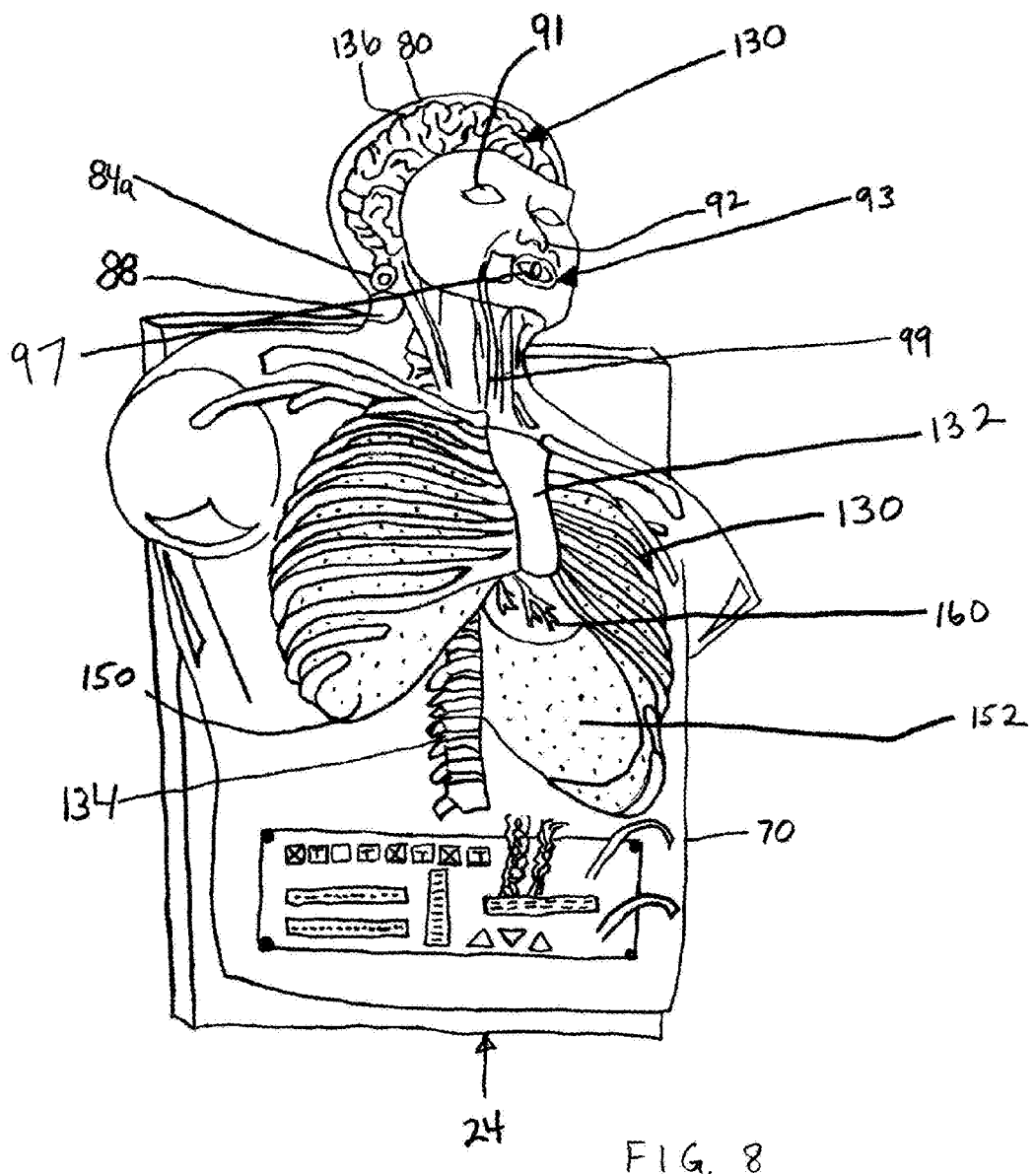
FIG. 8 is a perspective view of an alternate embodiment of a CPR mannequin according to the invention.

FIG. 8 illustrates a further embodiment. According to this embodiment, simulated ribs 130 and sternum 132 and spinal column 134 are provided within the shell 70. For a resilient compressible shell, these bones can provide some flexing during compression. For a hard shell 70, the breast bone or sternum can help educate the trainee on location of hand placement for performing chest compressions.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:
1. A CPR training mannequin, comprising
   a humanoid torso, the torso having a torso shell composed of a material having a degree of transparency and having sufficient material properties to withstand forces of simulated chest compressions;
   a humanoid head having a degree of transparency and pivotally connected to the torso and having a mouth opening connected to a ventilation tube forming a simulated airway;
   at least one resilient element;
   a base, the resilient element located between at least a top wall of the torso shell and the base, the resilient element resisting downward displacement of the top wall of the torso shell during simulated chest compressions;
   a simulated heart and simulated lungs arranged within the torso shell and visible through the top wall of the torso shell, the simulated heart and lungs including lights;
   a control;
   a ventilation sensor and a displacement sensor connected to the control, the ventilation sensor located in the ventilation tube and the displacement sensor measuring movement of the top wall of the torso shell with respect to the base;
   a switch within a flexible nose of the head, the switch being signal-connected to the control to indicate the nose is properly pinched closed;
   wherein when the head is correctly tilted to open the simulated airway, the control issues an initial illumination command to light the lung lights;
   wherein pinching of the nose triggers the switch to indicate the nose is properly pinched closed; and,
   wherein when the head is correctly tilted open and the nose is properly pinched closed the control compares ventilation from the ventilation sensor with acceptable CPR values and issues a second illumination command to further light the lung lights if the ventilation is satisfactory with the acceptable CPR values; and,
   wherein the control compares displacement from the displacement sensor with acceptable CPR values, and issues an illumination command to light the heart lights if the displacement is satisfactory with acceptable CPR values.

2. The CPR training mannequin according to claim 1, wherein the head comprises a head shell composed of a material having a degree of transparency and the head includes a simulated brain visible through the head shell, the brain having brain lights, the brain lights receiving a command to illuminate from the control if the displacement is acceptable.

3. The CPR mannequin according to claim 1, wherein the resilient element is arranged between a support wall within the torso shell and the base, wherein during simulated chest compressions the entire torso shell is displaced.

4. The CPR mannequin according to claim 1, wherein the ventilation sensor measures flow rate of air.

5. The CPR mannequin according to claim 1, wherein the control includes a timing counter and compares the rate of simulated chest compressions and acceptable CPR compression rate values and only if the rate and displacement are acceptable will the heart lights be illuminated.

6. The CPR mannequin according to claim 1, wherein the control includes a timing counter and compares the rate of ventilation and acceptable CPR ventilation rates and only if the rate and flow rate of ventilation are acceptable will the lung lights be illuminated.

7. A CPR mannequin, comprising:
   a humanoid torso, the torso having a torso shell composed of a material having a degree of transparency, and having strength sufficient to withstand forces of simulated chest compressions;
   a humanoid head pivotally connected to the torso and having a mouth opening connected to a ventilation tube forming a simulated airway;

at least one resilient element;
a base, the resilient element located between at least a top wall of the torso shell and the base, the resilient element resisting downward displacement of the top wall of the torso during simulated chest compressions;
a first light and a second light within the torso shell;
a control;
a ventilation sensor and a displacement sensor connected to the control, the ventilation sensor in communication with the ventilation tube and the displacement sensor measuring movement of the top wall of the torso shell with respect to the base;
wherein the control compares ventilation from the ventilation sensor with acceptable CPR values and compares displacement from the displacement sensor with acceptable CPR values, and issues an illumination command to light the first light if the displacement is satisfactory and to light the second light if the ventilation is satisfactory; and
a switch within a flexible nose of the head; and,
wherein pivoting the head back issues an initial illumination command to initially light the second light if the airway opening is satisfactory, and,
wherein pinching the nose triggers the switch, the switch being signal-connected to the control; and,
wherein when the nose is sufficiently pinched closed and the head is correctly tilted back to open the airway the control compares ventilation from the ventilation sensor with acceptable CPR values and issues a second illumination command to light the second light if ventilation is satisfactory with acceptable CPR values.

8. The CPR training mannequin according to claim 7, wherein the head includes a head shell composed of a material having a degree of transparency and the head includes a third light, the third light receiving a command to illuminate from the control if the displacement is acceptable.

9. The CPR mannequin according to claim 7, wherein the resilient element is arranged between a support wall within the torso shell and the base, wherein during simulated chest compressions the entire torso shell is displaced.

10. The CPR mannequin according to claim 7, wherein the ventilation sensor measures flow rate of air.

11. The CPR mannequin according to claim 7, wherein the head further includes a sensor that is triggered when the head is correctly tilted to open the simulated airway.

12. The CPR mannequin according to claim 7, wherein the control includes a timing counter and compares the rate of simulated chest compressions and acceptable CPR compression rate values and only if the rate and displacement are acceptable will the first light be illuminated.

13. The CPR mannequin according to claim 7, wherein the control includes a timing counter and compares the rate of ventilation and acceptable CPR ventilation rates and only if the rate and flow rate of ventilation are acceptable will the second light be illuminated.

14. A CPR training mannequin, comprising
a humanoid torso, the torso having a torso shell composed of a material having a degree of transparency and configured to withstand forces associated with simulated chest compressions;
a transparent humanoid head pivotally connected to the torso and having a mouth opening connected to a ventilation tube forming a simulated airway;
a simulated brain visible through the head, the simulated brain including lights;
a plurality of resilient elements, each resilient element including a first cylinder and a second cylinder telescopically fit within the first cylinder;
a base, the resilient elements located between at least a top wall of the torso shell and the base, the resilient elements resisting downward displacement of the top wall of the torso shell during simulated chest compressions;
a simulated heart arranged within the torso shell and visible through the top wall of the torso shell, the simulated heart including lights;
a set of simulated lungs arranged within the torso shell and visible through the top wall of the torso shell, the simulated lungs including a first and a second plurality of lights;
a control;
a ventilation sensor and a displacement sensor connected to the control, the ventilation sensor located in the ventilation tube and the displacement sensor measuring movement of the top wall of the torso shell with respect to the base;
a switch within a flexible nose of the head, the switch being signal-connected to the control, wherein the control determines the nose is sufficiently pinched closed; and,
wherein when the head is correctly tilted to open the simulated airway, the control issues an initial illumination command to light the first plurality of lung lights;
wherein when the nose is sufficiently pinched closed, and the head is correctly tilted to open the simulated airway the control compares ventilation from the ventilation sensor with acceptable CPR values and issues an illumination command to light the second plurality of lung lights if the ventilation is satisfactory and acceptable CPR values are met; and,
wherein the control compares displacement from the displacement sensor with acceptable CPR values and issues an illumination command to light the heart lights and the brain lights if displacement is satisfactory and acceptable CPR values are met.

15. The CPR mannequin according to claim 14, wherein the control includes a timing counter and compares the rate of simulated chest compressions and acceptable CPR compression rate values and only if the rate and displacement are acceptable will the heart lights be illuminated.

16. The CPR mannequin according to claim 14, wherein the control includes a timing counter and compares the rate of ventilation and acceptable CPR ventilation rates and only if the rate and flow rate of ventilation are acceptable will the lung lights be illuminated.

* * * * *